United States Patent
Oomori et al.

(10) Patent No.: US 7,401,772 B2
(45) Date of Patent: Jul. 22, 2008

(54) DOCUMENT FEEDER AND IMAGE READING APPARATUS WITH THE SAME

(75) Inventors: Masaki Oomori, Yamanashi-ken (JP); Makoto Shimizu, Yamanashi-ken (JP); Toshihito Shiina, Yamanashi-ken (JP); Shuji Ishimaru, Kofu (JP); Osamu Jinza, Yamanashi-ken (JP)

(73) Assignee: Nisca Corporation, Yamanashi (JP)

( * ) Notice: Subject to any disclaimer, the term of this patent is extended or adjusted under 35 U.S.C. 154(b) by 672 days.

(21) Appl. No.: 10/786,013

(22) Filed: Feb. 26, 2004

(65) Prior Publication Data

US 2005/0035527 A1  Feb. 17, 2005

(30) Foreign Application Priority Data

Jul. 11, 2003 (JP) ............... 2003-273769
Dec. 4, 2003 (JP) ............... 2003-405442

(51) Int. Cl.
B65H 85/00 (2006.01)
(52) U.S. Cl. .............. 271/3.14; 271/225; 271/3.01; 399/365
(58) Field of Classification Search ........... 271/3.14, 271/3.01, 4.01, 3.22, 3.23, 225, 7; 399/365, 399/367; 358/496, 498
See application file for complete search history.

(56) References Cited

U.S. PATENT DOCUMENTS

| 4,264,187 | A | * | 4/1981 | Rhodes, Jr ............... 399/374 |
| 4,345,751 | A | * | 8/1982 | Holzhauser ............... 271/3.07 |
| 4,412,738 | A | * | 11/1983 | Ahern et al. ............... 355/76 |
| 4,699,365 | A | * | 10/1987 | Smith et al. ............... 271/3.05 |
| 5,005,052 | A | * | 4/1991 | Watanabe et al. ......... 399/373 |
| 5,060,923 | A | * | 10/1991 | Takimoto et al. ......... 271/7 |
| 5,328,163 | A | * | 7/1994 | Yamada ............... 271/10.01 |
| 5,438,435 | A | * | 8/1995 | Lawniczak ............... 358/496 |

FOREIGN PATENT DOCUMENTS

| EP | 0363807 | * | 4/1990 |
| JP | 62-126044 | | 6/1987 |
| JP | 5-47816 | | 7/1993 |
| JP | 5-77507 | * | 9/1993 |

* cited by examiner

Primary Examiner—Patrick Mackey
Assistant Examiner—Thomas A Morrison
(74) Attorney, Agent, or Firm—Manabu Kanesaka

(57) ABSTRACT

A sheet feeding device includes a sheet feed stacker and a transport belt disposed along a platen substantially horizontally; a discharge stacker disposed above the sheet feed stacker; and a light-shielding cover member provided between the platen and the sheet feed stacker for blocking light from the platen. The entire device is arranged above the platen, and it is easy to mount and dismount the device relative to the platen. An original is transported from the sheet feed stacker and to the discharge stacker along the platen with little damage.

3 Claims, 15 Drawing Sheets

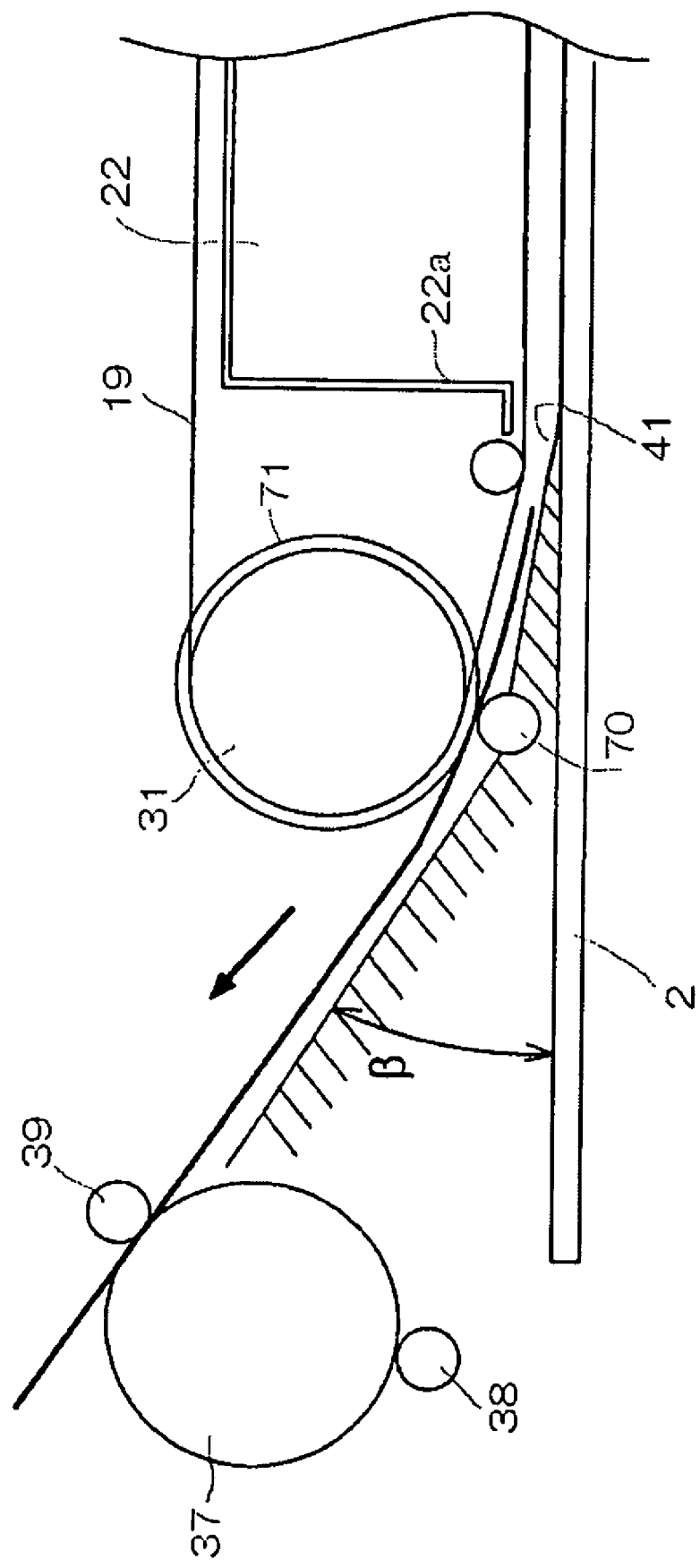

DOCUMENT FEEDER AND IMAGE READING APPARATUS WITH THE SAME

BACKGROUND OF THE INVENTION AND RELATED ART STATEMENT

The present invention relates to a document feeder for feeding an original from a sheet feed stacker to an image reading platen in an image input device such as a copy machine, a printer, a scanner, and a facsimile machine, and storing the originals on a sheet discharge stacker. The present invention also relates to an image reading apparatus with the document feeder.

In general, there have been various feeding devices for automatically feeding and placing an original from a sheet feed stacker to an image reading platen in a scanner. A conventional feeding device is mounted on an upper portion of the platen of the image reading apparatus using the hinge so that the feeding device can be freely opened and closed. When the feeding device is not used for reading an original, an operator opens the feeding device to place the original on the platen manually and then covers the platen with the feeding device.

Recently, a copy machine, a scanner, and the like have been connected to a computer system in a network for reading images for a variety of purposes. For example, there has been a growing need for automatically feeding a special original, e.g., a photograph, negative film, and OHP (overhead projector) sheet, to a platen for reading with a feeding device. It is preferable that an operator can easily mount and remove such a device in use. Accordingly, it is required to make the device compact and light.

Japanese Patent Publication (Kokai) No. 62-126044 has disclosed a compact device in which transporting means is disposed above a platen, and a sheet feed stacker and a discharge stacker are arranged in parallel vertically above the transporting means. An original is transported from the sheet feed stacker through a U-shaped path and returned to the discharge stacker through the U-shaped path. In the device, it is difficult to transport a photograph, OHP sheet, and the like through the curved route, i.e. the U-shaped path, without damaging. The device has a relatively large height over the platen, thereby making the device unstable upon installing and dismounting.

Japanese Patent Publication (Koukoku) No. 05-47816 has disclosed a device in which a transport belt is disposed above a platen for transporting an original from a stacker located at a lower side. In this case, it is difficult to easily mount and dismount the entire unit above the platen. Further, in the device, the discharge stacker is located above the sheet feed stacker. An original is transported from the sheet feed stacker along the platen, and switched back and discharged from the platen to the discharge stacker. Accordingly, it is necessary to dispose the sheet feed stacker and discharge stacker in a vertical space as small as possible. When the discharge stacker is disposed above the sheet feed stacker in a small space, it is difficult to set originals on the sheet feed stacker at a proper position.

Japanese Utility Model (Koukoku) No. 59-7316 has disclosed a device in which a discharge stacker is rotatably mounted on a frame at an upper position, so that the discharge stacker is lifted to extend a space above a sheet feed stacker when an original is placed. In the device, the discharge stacker is disposed above the sheet feed stacker. A forward end of the discharge stacker in the feeding direction is supported on the frame, and a rear end of the discharge stacker is rotatable vertically. When sheets are stored on the sheet feed stacker, the discharge stacker is rotated upwardly, thereby making it easy to place the sheets.

In the device in which the transporting means, sheet feeding and discharging stackers are arranged above the platen of a scanner, etc., or the sheet feeding and discharging stackers are arranged at a side of the platen, and the originals are transported to the transporting means above the platen, it is still difficult to mount and dismount the device above the platen. Also, it is difficult to provide a transporting mechanism such as a vacuum fan for a special original such as a photograph above the platen due to a spatial limitation.

As described above, in the device disclosed in Japanese Utility Model Publication (Koukoku) No. 59-7316, the discharge stacker is rotatable to extend a space between the sheet feed stacker and the rear end of the discharge stacker when an original is placed on the sheet feed stacker. However, a space between the sheet feed stacker and the forward end of the discharge stacker is narrow (forward end in the feeding direction). Accordingly, when the original is inserted, the original is rubbed and may be damaged. Especially in a case that the original like a photograph has a surface coated with a soft material such as gelatin, when a bundle of the originals is inserted into the wedge-shaped forward end of the stacker, the originals contact against with each other and may be damaged or the uppermost sheet of the originals is damaged by a paper feed roller.

Therefore, in the device disclosed in Japanese Utility Model Publication (Koukoku) No. 59-7316, in which the space at the rear end of the stacker is widened, it is still difficult to place the originals on the sheet feed stacker at a right position without causing damage. It is possible that the originals are transported with forward end damaged or bent, thereby causing paper jam.

In view of the problems described above, the present invention has been made, and an object of the invention is to provide a feeding device capable of reliably transporting an original from a sheet feed stacker along a platen, and an image reading apparatus provided with the feeding device. The feeding device has a unit structure of a sheet feed stacker, a sheet discharging stacker and transporting means, so that it is easy to mount and remove the unit structure above the platen. Also, the feeding device can feed and discharge a special original such as a photograph and OHP sheet.

Another object of the invention is to provide a feeding device with a simple structure, in which it is easy to place a bundle of originals in a proper posture on the sheet feed stacker arranged below the discharge stacker in parallel. It is possible to easily insert a forward end of the original between a feeding member such as a paper feed roller and a bottom surface of the stacker without damage. It is also possible to feed and discharge a susceptible original such as a photograph at a predetermined position on the platen. Accordingly, the originals are placed on the sheet feed stacker, and discharged to the sheet discharging stacker with little damage.

Further objects and advantages of the invention will be apparent from the following description of the invention.

SUMMARY OF THE INVENTION

In order to attain the objects described above, according to the present invention, a sheet feeding device includes a sheet feed stacker and a transport belt disposed along a platen substantially horizontally; a discharge stacker disposed above the sheet feed stacker; and a light-shielding cover member provided between the platen and the sheet feed stacker for blocking light from the platen.

Accordingly, the entire device is arranged above the platen, and it is easy to mount and dismount the device relative to the platen. An original is transported from the sheet feed stacker and to the discharge stacker along the platen with little damage, and a drive mechanism can be simplified. Further, it is possible to arrange an auxiliary transporting device such as a vacuum chamber for a special original above the transport belt. The original fed from the sheet feed stacker is sucked to the transport belt, thereby reducing friction between the platen and the original and transporting the original reliably.

According to the invention, the transport belt may be an endless belt placed between a pair of pulleys and having a tension roller for restricting a distance between the transport belt and the platen. A transporting guide is disposed between a paper feed roller and the pulleys for guiding the original to the endless belt between the pulleys and the tension roller. Accordingly, a forward end of the original abuts against the transport belt prior to reaching the platen, and the original is fed to a predetermined location on the platen by a transporting force of the belt.

According to the present invention, the transporting guide may be disposed between the sheet feed stacker and the transport belt for guiding the original at an angle of 5 to 25 degrees with respect to the platen surface. An angle formed between the discharge stacker and the platen is set to be 30 to 50 degrees. Accordingly, the forward end of the original transported from the sheet feed stacker abuts against the transport belt, and the original is transported to the predetermined location by the transporting force of the belt. Then, the original is peeled off from the platen with a large angle and discharged, thereby feeding and discharging the original more reliably.

According to the present invention, the transporting guide may be provided at a forward end thereof with an elastic film member contacting the platen surface for urging the forward end of the original toward the transport belt, or an idle roller for nipping the original between the idle roller and the transport belt. Accordingly, particularly in a case that a vacuum fan is provided for sucking the original toward the belt, the original is sucked with the forward end in close contact with the transport belt, so that the original can be transported reliably even with a small sucking force.

According to the present invention, the sheet feed stacker, discharge stacker, and transport belt may be mounted on a device frame. The device frame is provided with a lateral-positioning member for abutting against the platen of an image reading apparatus to restrict a position of the transport belt in a lateral direction and a vertical-positioning member for restricting the position of the transport belt in a vertical direction, thereby mounting the device above the platen correctly.

According to the present invention, the sheet feed stacker and discharge stacker may be arranged in parallel vertically in this order above the platen for reading an image. The discharge stacker is rotatably mounted on the device frame so that a distance between a rear end of the discharge stacker in a feeding direction and the sheet feed stacker can be widened. The sheet feed stacker is rotatably mounted on the device frame so that a forward end of the sheet feed stacker in the feeding direction can be away from feeding means such as the paper feed roller.

According to the present invention, interconnecting means may be provided for working in conjunction with a rotational motion of the discharge stacker to move the forward end of the sheet feed stacker away from the feeder means. The interconnecting means may be composed of cam means such as an eccentric cam for transmitting the motion of the discharge stacker to the sheet feed stacker, or a gear for transmitting the rotational motion of the discharge stacker to a supporting shaft of the sheet feed stacker. The rear end of the discharge stacker is rotated to widen the space above the sheet feed stacker, so that a bundle of sheets can be placed easily. Also, the forward end of the sheet feed stacker is interconnected and moves away from the feeder means, so that the forward end of the sheet is inserted smoothly and placed in a proper posture.

According to the present invention, the sheet feed stacker and the transporting means may be arranged in parallel above the platen along the platen, and the discharge stacker may be arranged above the sheet feed stacker in parallel vertically. The transporting means feeds the sheet on the sheet feed stacker along the platen, and is rotated in reverse to discharge the sheet on the platen to the discharge stacker, so that the original is fed and discharged along a substantially linear path without being bent, thereby transporting the originals smoothly under a reduced stress without damage. The transporting means may include an endless belt arranged away from the platen with a small gap and connected to drive means capable of rotating in forward and reverse directions. Also, vacuum means may be provided in the endless belt for sucking the sheet. The vacuum means includes a vacuum chamber covering the belt and a fan for evacuating an inside of the chamber.

According to the present invention, an image reading apparatus includes a platen for placing an original at a predetermined position; image reading means for reading the original on the platen; a sheet feed stacker disposed above the platen for stacking the original; a paper feed roller for pulling the original on the sheet feed stacker; transporting means for transporting the original from the paper feed roller to the predetermined position on the platen; and a discharge stacker arranged above the sheet feed stacker in parallel away from the sheet feed stacker with a predetermined distance for storing the original transported by the transporting means.

In the image reading apparatus, the discharge stacker is rotatably mounted so as to widen a distance between a rear end of the discharge stacker in a feeding direction and the sheet feed stacker. Also, interconnecting means may be provided for working in conjunction with a rotational motion of the discharge stacker to move a forward end of the sheet feed stacker in the feeding direction away from a paper feed roller.

BRIEF DESCRIPTION OF THE DRAWINGS

FIGS. 14a and 14b are schematic views of the feeding device shown in FIG. 2, wherein FIG. 14a is a view for explaining a state that the original is transported to the platen, and FIG. 14b is a view for explaining a state that the original is discharged from the platen.

DETAILED DESCRIPTION OF PREFERRED EMBODIMENTS

Hereunder, embodiments of the present invention will be explained with reference to the accompanying drawings. FIGS. 1-5 are views of an image reading apparatus with a document feeding device incorporated therein as a unit.

Figure 1:
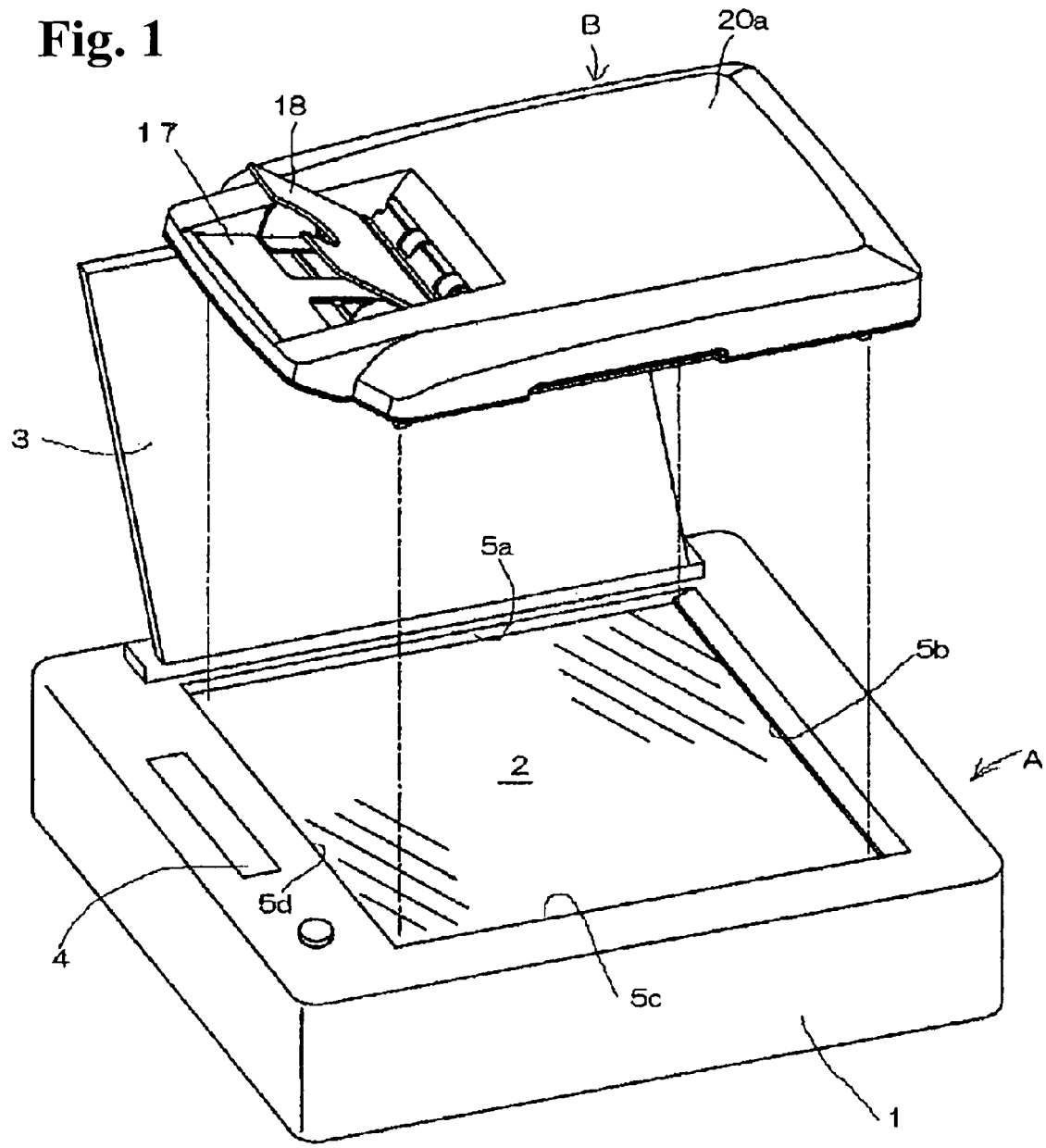
FIG. 1 is a perspective view showing a document feeder mounted on a scanner device.
Figure 2:
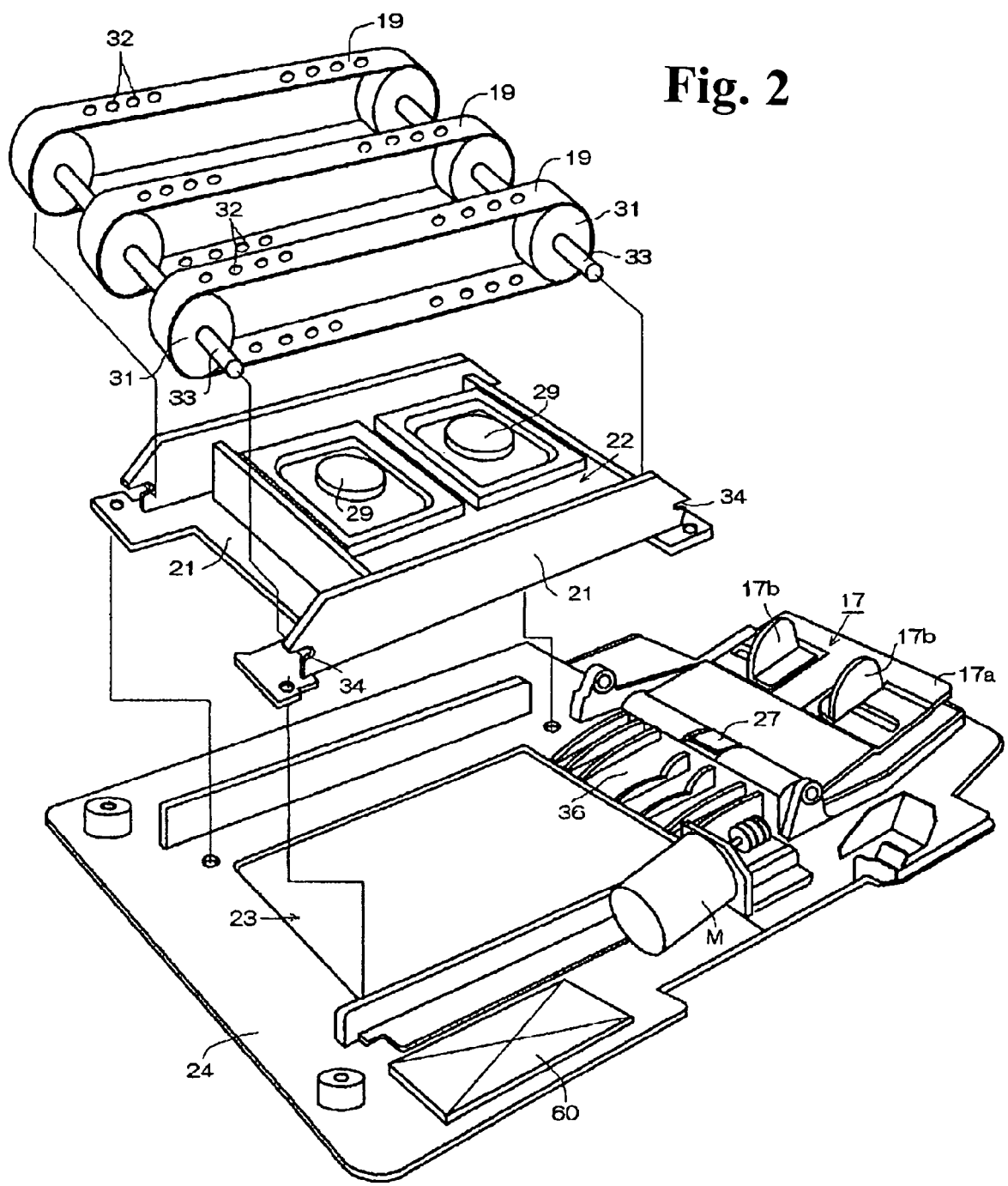
FIG. 2 is an exploded perspective view of the feeding device shown in FIG. 1.
Figure 3:
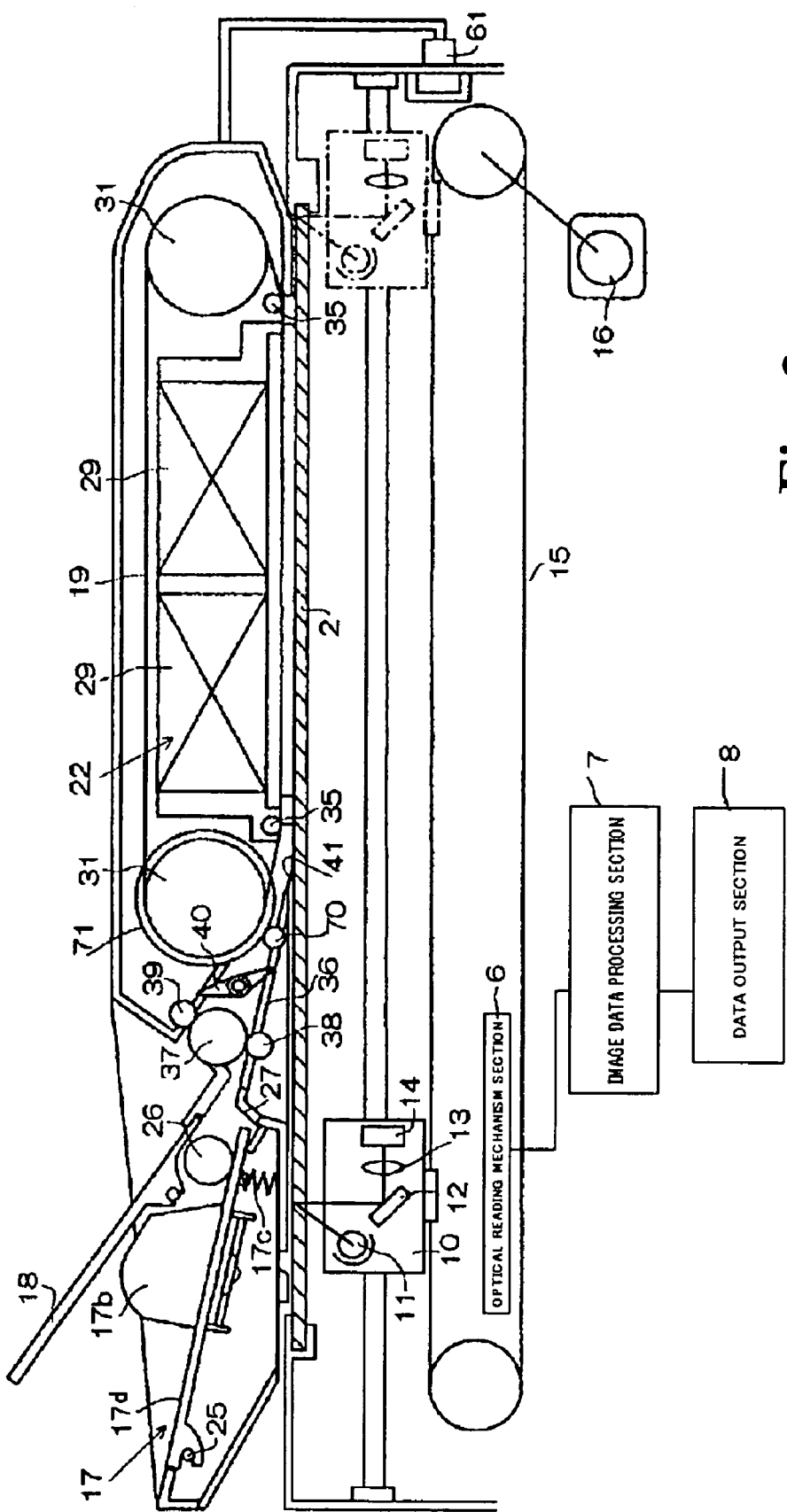
FIG. 3 is a sectional view of the feeding device shown in FIG. 2.
Figure 4:
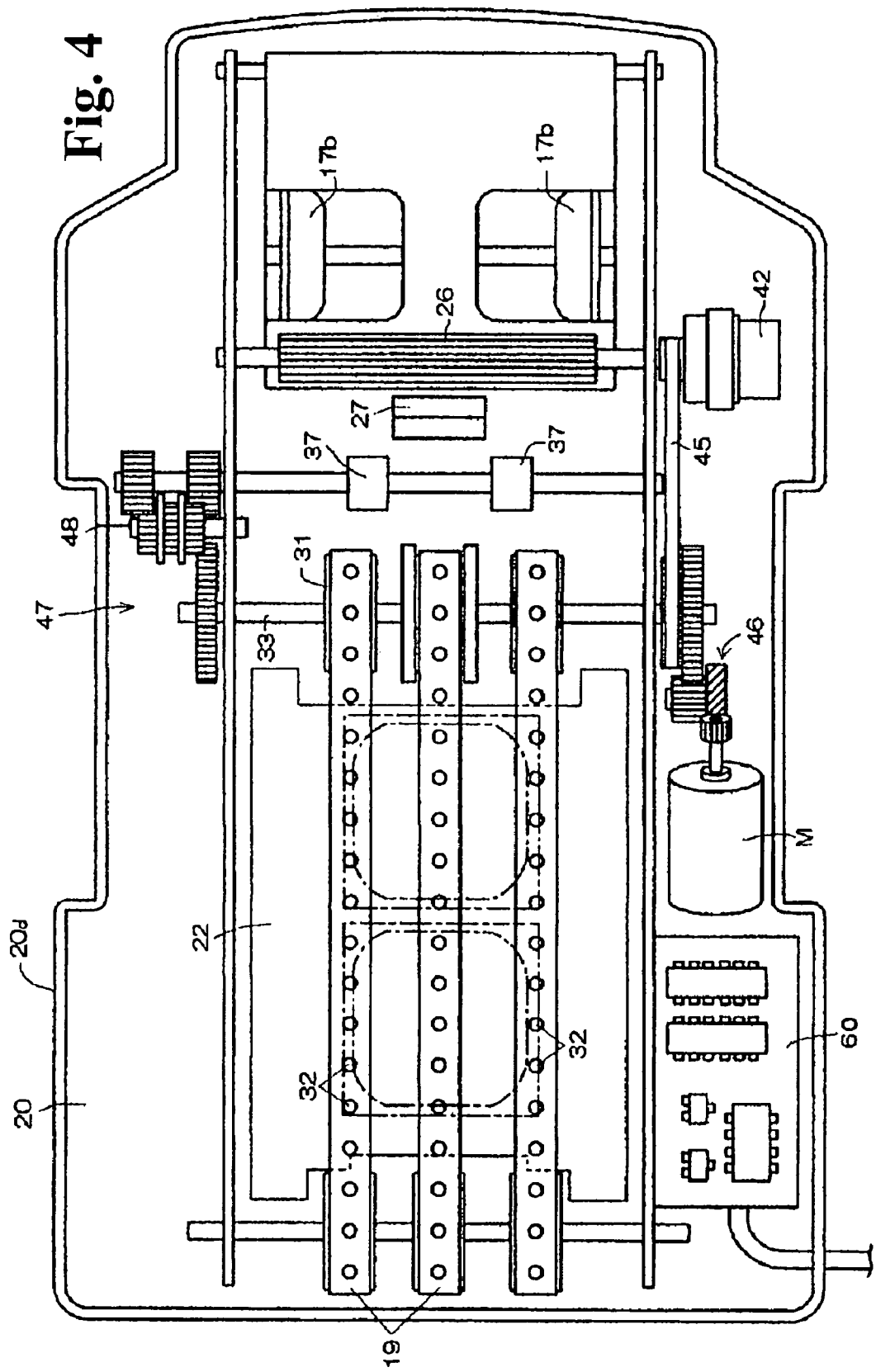
FIG. 4 is a plan view of the feeding device shown in FIG. 2.
Figure 5:
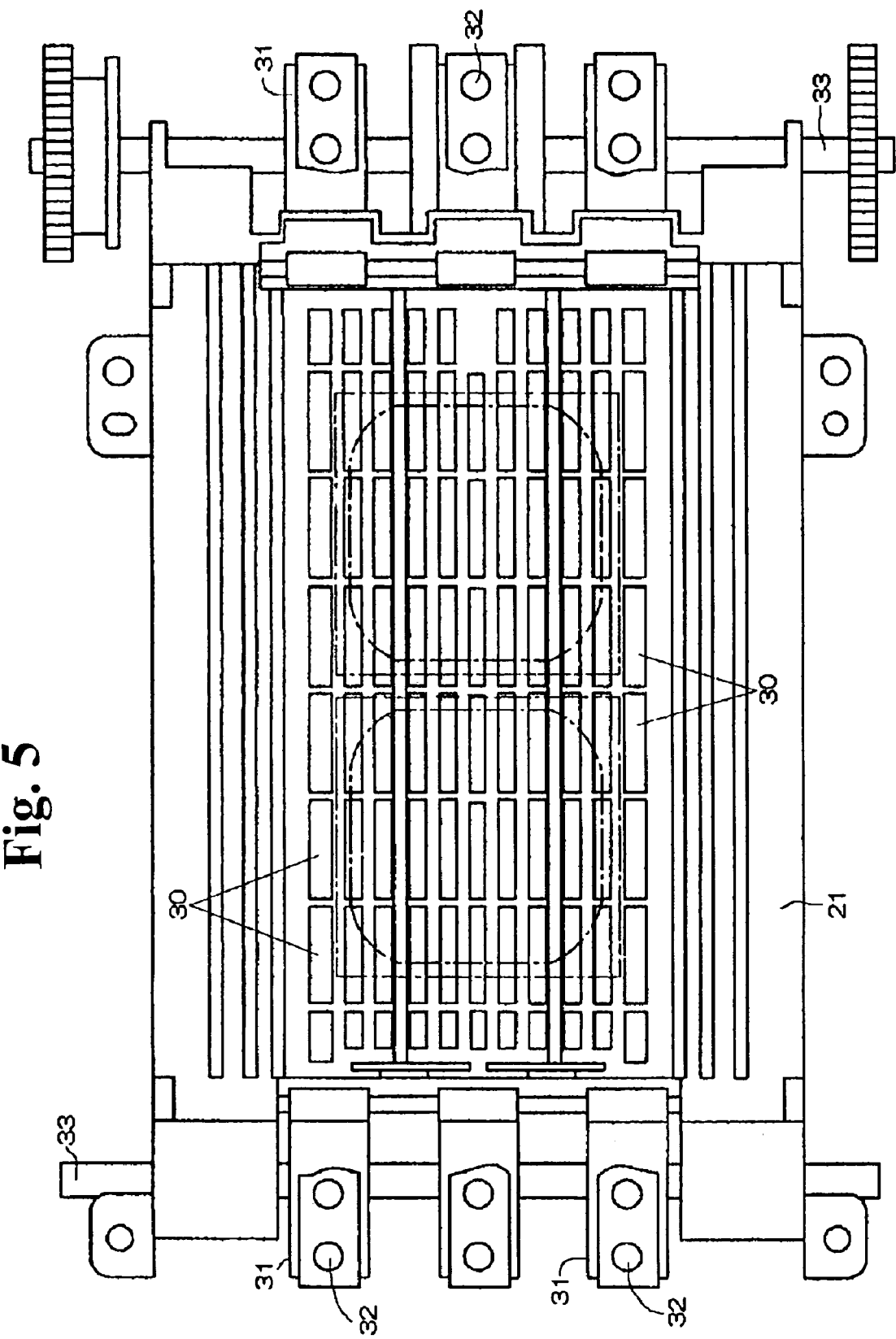
FIG. 5 is a bottom view of a transporting unit constituting the feeding device shown in FIG. 2.
Figure 6:
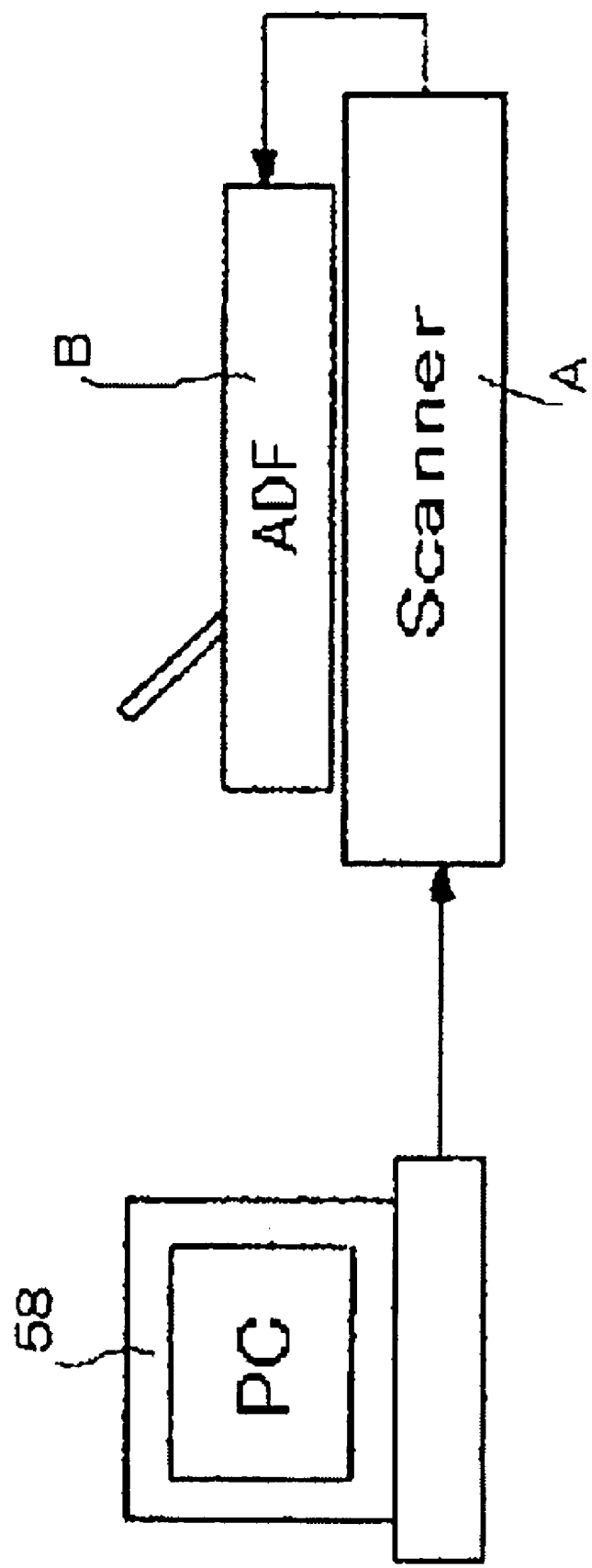
FIG. 6 is a schematic view showing a state that an external device, image reading apparatus, and feeding device are connected.

FIG. 1 is a perspective view showing a condition in which a feeding device B is installed on the image reading apparatus; FIG. 2 is an exploded perspective view of the feeding device; FIG. 3 is a longitudinal cross-sectional view of the feeding device shown in FIG. 2; FIG. 4 is a plane view of the feeding device shown in FIG. 2; and FIG. 5 is an illustration showing a bottom of a transporting unit constituting a part of the feeding device shown in FIG. 2.

As shown in FIG. 1, a feeding device B is installed above a platen 2 of an image reading apparatus A such as a scanner device. In the image reading apparatus A, the platen 2 is provided on a part of a casing 1. The platen 2 is formed of a transparent and flat glass plate so as to place an original on a top surface thereof.

The casing 1 supports the platen 2, and is provided with a flange having a step 5a for abutting against an original to restrict a setting position of the original. A platen cover 3 is rotatably supported on the casing 1, so that the cover opens and closes the top face of the platen 2. Inside the casing 1, there are provided an optical reading mechanism section 6, an image data processing section 7, a data output section 8, and a control section, as shown in FIG. 3.

The optical reading mechanism section 6 has a carriage 10 movable along the platen 2. The carriage contains a light source 11, a reflecting mirror 12, an image-forming lens 13, and a photoelectric converter 14. The carriage 10 moves along a guide rail (not shown) with a driving wire 15 and a drive motor 16 mounted on the wire in right and left directions of FIG. 3. Therefore, the drive motor 16 is rotated to move the carriage 10 along the platen 2.

The photoelectric converter 14 in the carriage 10 is composed of a line sensor, e.g. CCD (charge coupled device). The carriage 10 is arranged to irradiate the platen 2 with light from the light source 11, and the light reflected from the original set on the platen 2 is guided to the image-forming lens 13 through the reflecting mirror 12, so that the image-forming lens 13 condenses the light on the photoelectric converter 14.

In the image data processing section 7, data from the photoelectric converter 14 undergoes analog-to-digital (A/D) conversion into a binary or multi-coded form, and data correction including dither correction and gamma correction. The resultant data is stored in a storage element such as a frame buffer. The corrected data is output as an electric signal from the data output section 8 to an external computer or a printer device.

In regard to the structure of the above-described image reading apparatus, there have been known various structures as a general arrangement. Also, a flash exposure method has been well known, in which a plane sensor (area sensor) is used as the photoelectric converter to photoelectrically convert an entire original all at once without moving along the platen, and such a method can be adapted to the embodiment of the invention.

Likewise, the carriage 10 may contain a contact-type sensor manufactured by integrating the photoelectric converter with a SELFOC lens. In the embodiment, a photoelectric converting mechanism is shown in which an image is formed on the CCD through the reducing optical system with the image-forming lens.

It is common in the ordinary scanner devices and copying machines that a user sets an original on the platen 2 and covers the platen 2 with the platen cover 3, and then pushes an operation button for reading an image on the original. Instead of the platen cover 3, an automatic document feeder (ADF) for automatically feeding the original may be mounted. The ADF device has been widely used and known. The ADF device has a sheet feed stacker and a discharge stacker arranged in line vertically, and a U-shaped transporting path is provided between the sheet feed stacker and the discharge stacker, so that the platen faces the transporting path at a midway along the path. Accordingly, the originals can be sequentially read while passing at a constant speed while the carriage 10 is stopped. The ADF device may be rotatably installed on the platen 2 like the platen cover 3, and the top face of the platen 2 can be uncovered.

The feeding device B installed on the platen 2 includes a sheet feed stacker 17 on which an original is placed; a discharge stacker 18; and transport belts 19 for transporting the original from the sheet feed stacker 17 to the discharge stacker 18, all of which are mounted on a device frame 20. The feeding device may be provided with the following features for feeding a silver-silver chloride photograph and the like. However, the invention is not necessarily limited to the feeder for silver-silver chloride photographs.

In general, a surface of the silver-silver chloride photograph is coated with a gelatin like substance. Therefore, when the photograph is transported while pressing against a glass platen, it is possible to cause a feeding trouble or damage on the surface of the photograph. In order to solve this problem, the transport belts 19 are disposed away from the surface of the platen to form a small space therebetween, and a vacuum chamber 22 is provided for sucking the photograph.

The sheet feed stacker 17 and transport belts 19 are aligned along the surface of the platen so that the original fed from the sheet feed stacker is sucked to the transport belt by a negative pressure in the vacuum chamber. In addition, a slope angle of a transporting guide located between the sheet feed stacker and the transport belt is determined so that the original is brought into close contact with the belt. Further, the transport belts 19 are installed with an inclination to the surface of the platen. A distance between the belts and the platen surface is determined based on experiments, so that the distance is larger than the thickness of the originals. The vacuum chamber 22 has a configuration described later.

A size of the photograph is smaller than that of a regular platen, e.g. A3 size in accordance with the Japanese Industrial Standards (JIS). When the feeding device has a same size as the platen, the device becomes large and heavy, thereby making it difficult to handle. According to the embodiment, a transporting case frame 21 is formed separately from the device frame 20 covering the entire platen, and covers a part of the platen required for transporting the original. Components for transporting the original such as the transport belts 19 and vacuum chamber 22 are disposed in the transporting case frame 21, so that the feeding device has a small size and lightweight. The device frame 20 is provided with a light-shielding cover member 24 for covering a platen surface area except a portion the transporting case frame 21 covers.

The device frame 20 is composed of an exterior cover 20a shown in FIG. 1 and a bottom frame 20b shown in FIG. 4, each formed of a synthetic resin and combined to form a housing for the entire device. The device frame 20 has a unitized structure, on which the sheet feed stacker 17, discharge stacker 18, transporting case frame 21, and a drive motor M (described later) are mounted.

The device frame 20 has a size to cover the entire platen 2 of the image reading apparatus A. The bottom frame 20b is provided with the exposure opening 23 for mounting the transporting case frame 21, and the light-shielding portion (light-shielding member) 24 for covering a portion of the platen 2 except a region corresponding to the opening 23.

The device frame 20 has a size larger than the platen 2, and the bottom frame 20b thereof is provided with the light-shielding portion (light-shielding member) 24, so that light from the light source 11 does not leak to the outside. The light-shielding portion (light-shielding member) 24 has a plate form and abuts against the platen 2.

The sheet feed stacker 17 and discharge stacker 18 are mounted to the bottom frame 20b. The sheet feed stacker 17 is provided with a pair of right and left side guides 17b, and rotatably fixed by pin 25 of the bottom frame 20b of the device with a angle so that the originals can fall down by gravity. The side guides 17b are mounted on the original-placing stacker 17a and are arranged to approach and separate from each other by the same distance for aligning the center of the originals of different sizes with the reference (center reference). Such a structure has been widely known as the rack and pinion combination, wires, etc.

At a forward end of the sheet feed stacker 17, a paper feed roller 26 is disposed so as to draw out an uppermost original on the stacker rightward in FIG. 3. A friction pad 27 is disposed in front of the roller 26. The paper feed roller 26 and friction pad 27 are made of a material with enough friction coefficient for separating the originals one by one, and their manufacturing conditions have been widely known. In the embodiment, a handle-and-separate structure, in which the originals are separated one by one when an end of the original pulled out by the paper feed roller 26 passes on the friction pad 27, is adopted to prevent the original from being damaged. The paper feed roller 26 and friction pad 27 are individually mounted on the bottom frame 20b of the device frame 20.

An urging spring 17c constantly presses the sheet feed stacker 17 against the paper feed roller 26. The discharge stacker 18 is disposed in parallel to the sheet feed stacker 17, and is mounted on the bottom frame 20b of the device frame 20. The sheet feed stacker 17 and discharge stacker 18 are arranged in line vertically so that the entire feeding device B is mounted on the platen 2 in a compact size.

Figure 8:
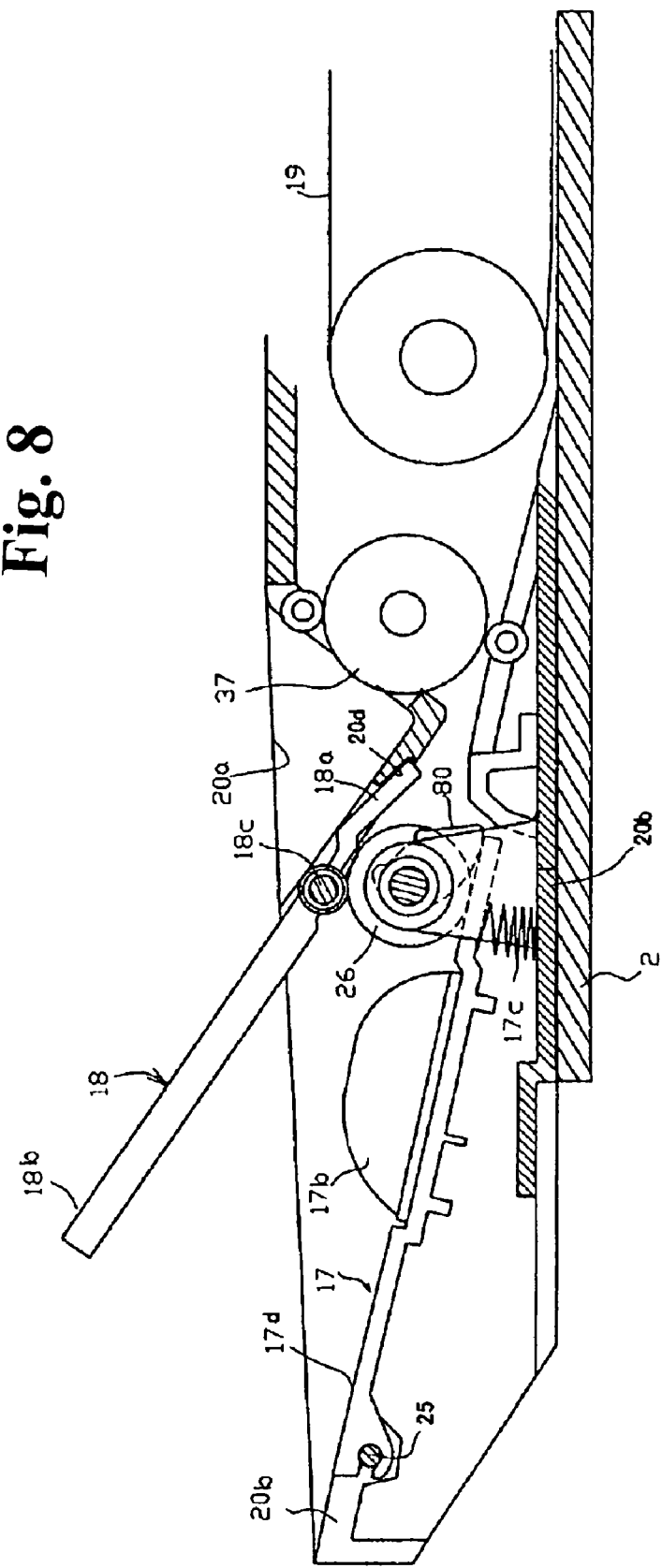
FIG. 8 is a view showing a mounting structure of a sheet feed stacker and a discharge stacker.
Figure 9:
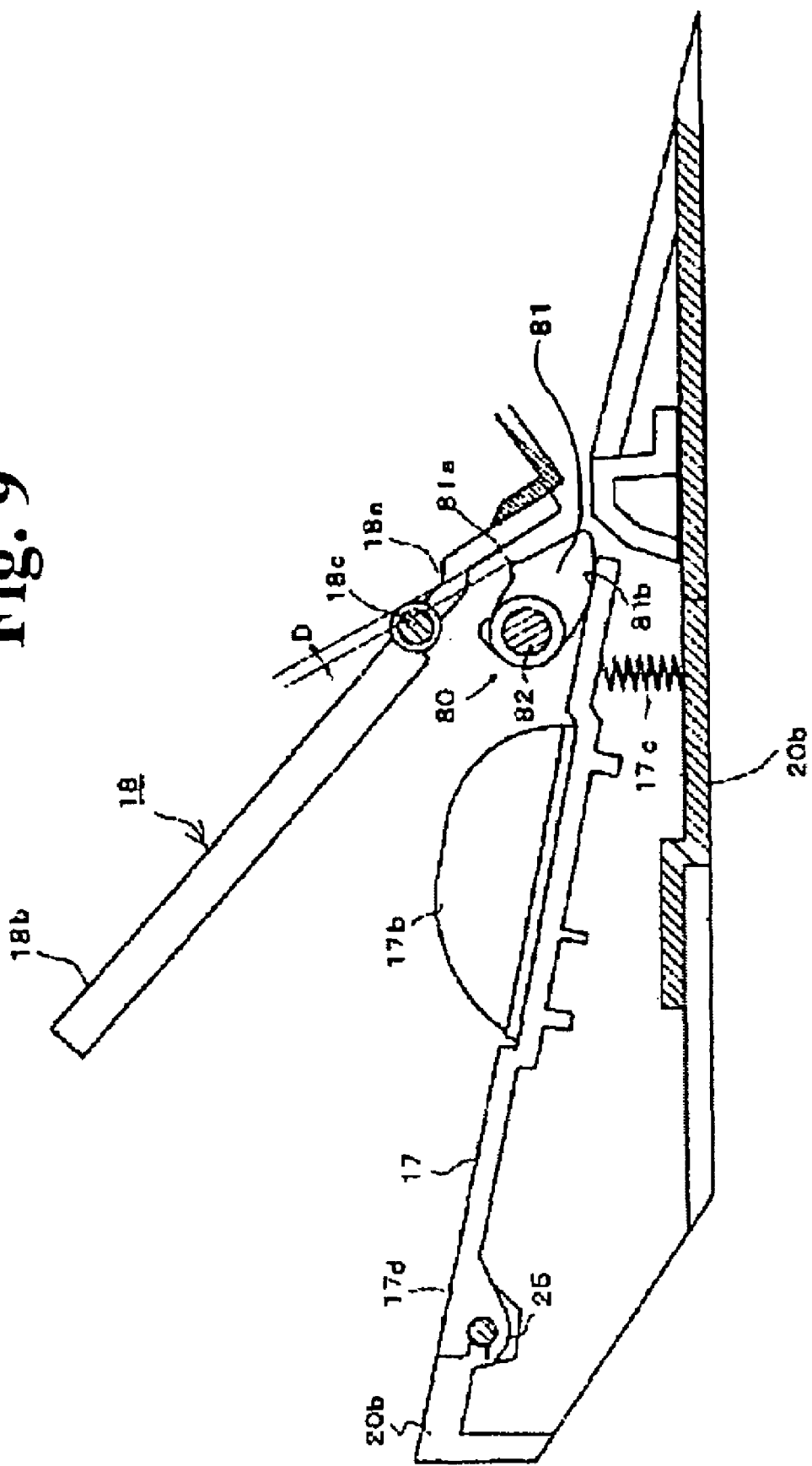
FIG. 9 is a view showing the sheet feed stacker and discharge stacker in an operation that a sheet is transported.

As shown in FIGS. 8 and 9, the sheet feed stacker 17 and discharge stacker 18 are formed in a stacker shape for placing the original (sheet), and are arranged vertically in parallel above the platen 2. A rear end portion 17d of the sheet feed stacker 17 in the feeding direction is pivotally supported on the bottom frame 20b of the device frame 20 with a pin 25. Accordingly, it is possible to rotate the sheet feed stacker 17 about the pin 25 while the forward end thereof is supported by the urging spring 17c.

The urging spring 17c is a coil spring and disposed between the bottom frame 20b and a bottom surface of the sheet feed stacker 17 for constantly pressing the forward end of the sheet feed stacker against the paper feed roller 26. A forward end 18a of the discharge stacker 18 in the feeding direction is pivotally supported on the exterior cover 20a of the device frame 20 with a pin 18c. The center of gravity of the discharge stacker is determined so as to rotate counterclockwise about the pin 18c in FIG. 8. The forward end 18a is hold to abut against the stopper wall 20d of the exterior cover 20a. When a rear end 18b of the stacker 18 is lifted in the arrow direction, the stacker 18 rotates about the pin 18c to a position shown in FIG. 10.

The sheet feed stacker 17 and discharge stacker 18 are interconnected through the interconnecting means 80. A cam 81 is disposed between the stackers 17 and 18 and rotatably supported on the bottom frame 20b with a shaft 82. The cam 81 has an eccentric cam surface on a periphery thereof, and an engagement surface 81a engages a bottom surface of the discharge stacker 18 and an engagement surface 81b engages a surface of the sheet feed stacker 17.

The interconnecting means 80 may include any structure having an eccentric cam so that the sheet feed stacker 17 is driven clockwise when the discharge stacker 18 is rotated clockwise in FIG. 9. As shown in FIG. 9, a clearance D is formed between the cam 81 and the discharge stacker 18. The shaft 82 is provided with a coil spring (not shown) for urging the cam 81 toward the sheet feed stacker 17. With this configuration, it is possible to prevent the sheet feed stacker 17 from moving to change a proper urging force between the paper feed roller 26 and the original when an operator applies a force to the discharge stacker 18, for example, removing the original. Accordingly, the clearance D is set at a proper value so that the forward end of the sheet feed stacker 17 is moved away from the paper feed roller 26 after the discharge stacker 18 is rotated by a predetermined angle.

As shown in FIGS. 2 and 5, the transporting case frame 21 is mounted at the exposure opening 23 of the device frame 20. The transporting case frame 21 has a vacuum chamber 22 integrally formed of a resin. The chamber 22 is provided with a vacuum fan 29, and the transport belts 19 are placed around the chamber. The transport belts 19 are composed of endless belts supported by a pair of pulleys 31, and have air holes 32 bored along its entire length. The rotational shafts 33 of the pulleys 31 are fitted in bearing grooves 34 formed in the transporting case frame 21 and rotatably supported. The transporting case frame 21 is provided with many vacuum through holes 30, so that the transport belts 19 transport the original while the original is sucked to the belt.

Figure 13:
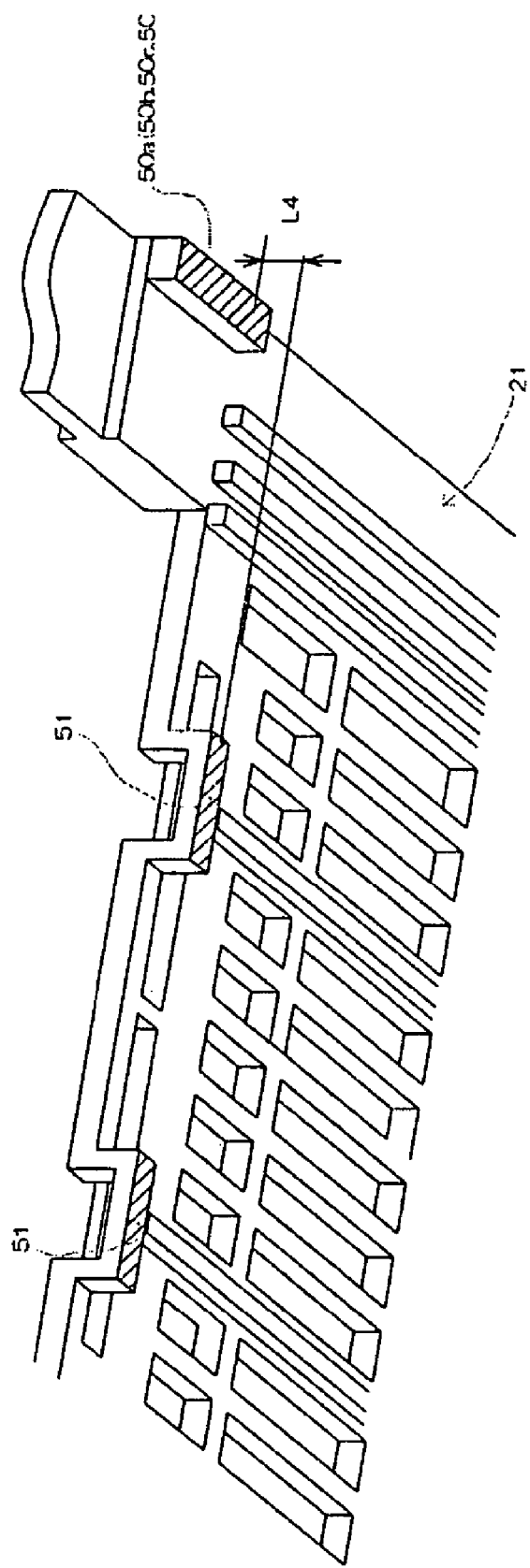
FIG. 13 is a perspective view showing an original stopper of the feeding device shown in FIG. 2.

As shown in FIG. 13, the transporting case frame 21 is provided with original stoppers 51 formed of projections disposed between the transport belts 19. The original stoppers 51 are integrated with the bottom frame 20b and have a height larger than that of vertically-positioning members 50 (described later) by L4. The stoppers 51 have a shape easy to deform elastically to the same height as the vertically-positioning member 50 when the device is mounted on the platen 2. Accordingly, the original stopper 51 can closely contact the platen 2 to stop the originals reliably.

Reference numeral 35 shown in FIG. 3 denotes a pair of right and left tension rollers disposed on one side of the transport belts 19 facing the platen 2 and radially inside the periphery of the transport belts for controlling the belt at a predetermined height so that the transport belts rotate smoothly.

A transporting guide 36 integrated with the transporting case frame 21 is disposed between the sheet feed stacker 17 and transport belt 19 for guiding the original from the sheet feed stacker 17 to the transport belt 19 and from the transport belt 19 to the discharge stacker 18. The transporting guide 36 is provided with a transporting roller 37 rotating counterclockwise in FIG. 3. A pinch roller 38 is disposed at a side of the roller 37 facing the sheet feed stacker 17, and a pinch roller 39 is disposed at a side of the roller 37 facing the discharge stacker 18. A drive mechanism (described later) drives the transporting roller 37 to draw the original toward the transport belt 19 on the feeding side and to eject the original on the discharge side, thereby making the device compact and simple.

Reference numeral 40 denotes a path-switching gate provided in the transporting guide 36. Reference numeral 41 denotes a pick-up guide made of a plastic film. The switching gate 40 has a weight such that, in the state shown in FIG. 3, the original from the sheet feed stacker 17 lifts the gate with the forward end thereof to move in the right direction, and the original moving from the platen in the left direction is guided to the discharge stacker 18. The pick-up guide 41 is formed of an elastic film, and picks up the original moving in the left direction and guides the original to the switching gate 40.

Figure 14A:
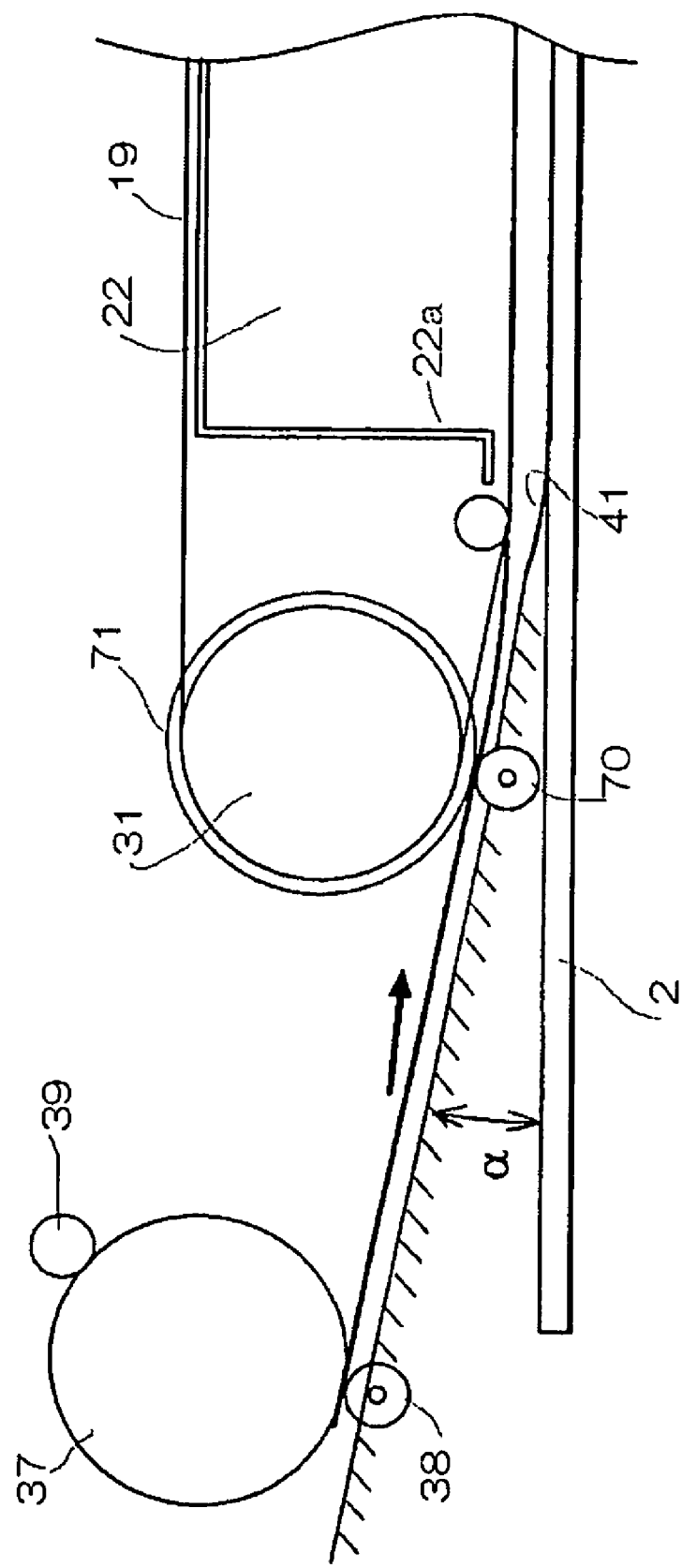

In the embodiment of the present invention, the transporting guide 36, transport belts 19, and vacuum chamber 22 are arranged as described below. As shown in FIG. 14a, the transporting guide 36 is disposed between the sheet feed stacker 17 and transport belts 19 with an angle of 5 to 25 degrees with respect to the platen 2. In other words, the original is transported along the transporting guide 36 from a contact point between the transporting roller 37 and pinch roller 38 with an angle of 5 to 25 degrees with respect to the platen 2. The angle is experimentally determined such that the original contacts the belt tightly to receive a transporting force of the belt when the forward end of the original enters a wedge-shaped gap formed between the pulleys of the transport belts 19 and the platen 2.

The transporting guide 36 is arranged such that the forward end of the original in the feeding direction reaches one end of the vacuum chamber 22 of the transport belts 19. In the embodiment, a forward end of the elastic pick-up guide 41 formed of a plastic material reaches an end portion 22a of the vacuum chamber 22. The vacuum chamber 22 has a weak sucking force at the end thereof as compared with a central portion. Accordingly, in a case that the original is a photograph and the like, once the original contacts the platen, the original tends to stick to the platen surface, and it is difficult to suck the original even when the original moves to the central portion of the chamber. With this configuration, it is possible to suck the forward end of the original at the end portion of the chamber, so that the original is smoothly sucked to the transport belts. Also, it is possible to solve the above problem by providing the transporting guide 36 with an idle roller 70 as shown in FIGS. 14a and 14b.

As shown in FIG. 2, the transport belts 19 include three rows of belts with a space therebetween. Drive rollers 71 are disposed between the belts. The original is inserted between the platen 2 and transport belts 19 while the drive rollers 71 and idle rollers 70 nip the original, so that the original is transported while being sucked to the transport belts.

The original is transported from the arrangement described above along the platen surface through the pick-up guide 41, transporting guide 36, transporting roller 37, and discharge stacker 18 in this order. In the embodiment, an angle between the platen surface and a line connecting the pick-up guide 41, the switching gate 40 and the contact point between the transporting roller 37 and pinch roller 39 is set between 30 and 50 degrees. With this configuration, it is possible to peel off the original from the belt 19 with a large angle relative to the platen, since the rear end of the original is strongly sucked to the transport belts 19 when the forward end of the original reaches the switching gate 40.

In drive mechanism, as shown in FIG. 4, the device frame 20 is mounted with the drive motor M capable of rotating in forward and reverse directions. The drive motor M rotates in forward and reverse directions to rotate the paper feed roller 26, transport belts 19, and transporting roller 37. The paper feed roller 26 is connected to the drive motor M through an electromagnetic clutch 42 using a driving belt 45 and a driving gear 46. The transport belts 19 are connected to the drive motor M using the driving gear 46 and also connected to the transporting roller 37 through a driving gear 47.

The driving gear 47 has a one-way clutch therein. When the drive motor M rotates in one direction, the driving force is transferred to the rotational shaft of the transporting roller 37, but the rotation in the opposite direction is not transferred. The rotation of the drive motor M in the opposite direction is changed in its rotational direction with the mid gear 48, and then transferred to the rotational shaft of the transporting roller 37.

As a result, the forward and reverse rotations of the drive motor M are transferred to the transport belts 19 as forward and reverse rotations. Also, the forward and reverse rotations are transferred to the transporting roller 37 as rotation in a single direction, i.e. counterclockwise direction in FIG. 3, all the time regardless of the rotational direction of the drive motor M. Reference numeral 60 denotes a control circuit board in the feeding device for supplying power to the drive motor M and controlling ON and OFF of the electromagnetic clutch 42.

The feeding device B is mounted over the top face of the platen 2 of the image reading apparatus A as follows. The platen 2 has steps relative to a flange 5 provided on the casing 1. The feeding device B is positioned with respect to the image reading apparatus A using the laterally-positioning members 49 to abut against the step set as an original-setting reference and the vertically-positioning members 50 to abut against the surface of the platen and installed on the image reading apparatus.

The bottom frame 20b constituting the device frame 20 has the laterally-positioning members 49 provided in the light-shielding portion (light-shielding member) 24, wherein the laterally-positioning members are composed of projections 49a, 49b, 49c, and 49d. The laterally-positioning members 49 are arranged to abut against the step of the flange 5 set as the original-setting reference of the image reading apparatus A thereby to determine the position of the feeding device B.

Figure 11:
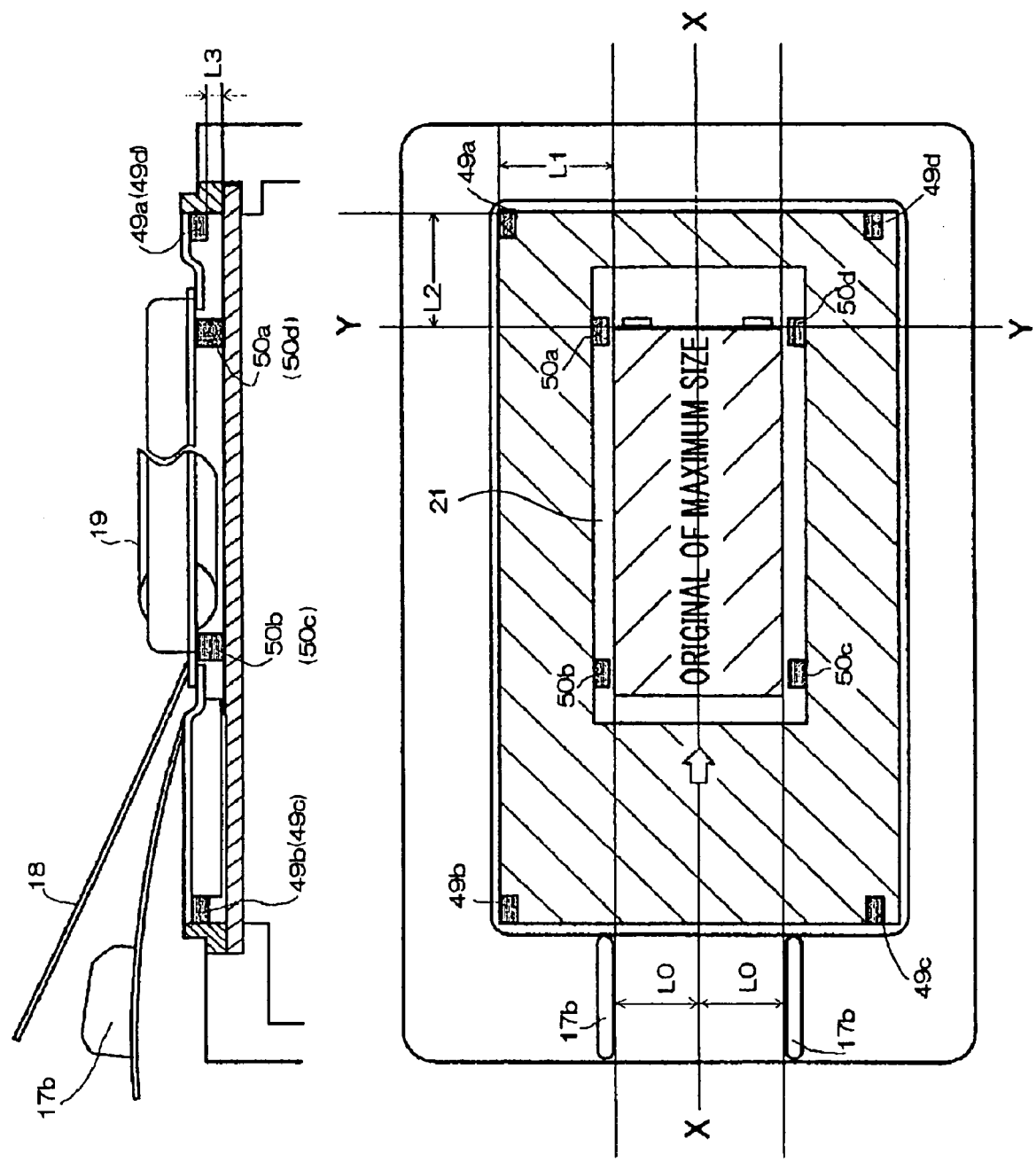
FIG. 11 is a view showing a geometric relation among a platen of the feeding device shown in FIG. 2, lateral positioning members, and vertical positioning members.

The vertically-positioning members 50 are provided on the transporting case frame 21. As shown in FIG. 11, on the bottom of the transporting case frame 21 are provided projections 50a, 50b, 50c, and 50d at four corners outside the original-transporting region, so that a space L3 is formed between the vacuum chamber 22 and the platen surface as shown in FIG. 11. In the laterally-positioning members 49 and vertically-positioning members 50, lengths of the projections are set so that only the vertically-positioning members 50 abut against the platen surface, whereas the laterally-positioning members 49 do not contact the surface. It is difficult to produce all the projections to have the same dimension in length (i.e. height). With this configuration, it is possible to avoid the condition where only the laterally-positioning members 49 abut against the platen surface and the vertically-positioning members 50 do not.

Figure 12:
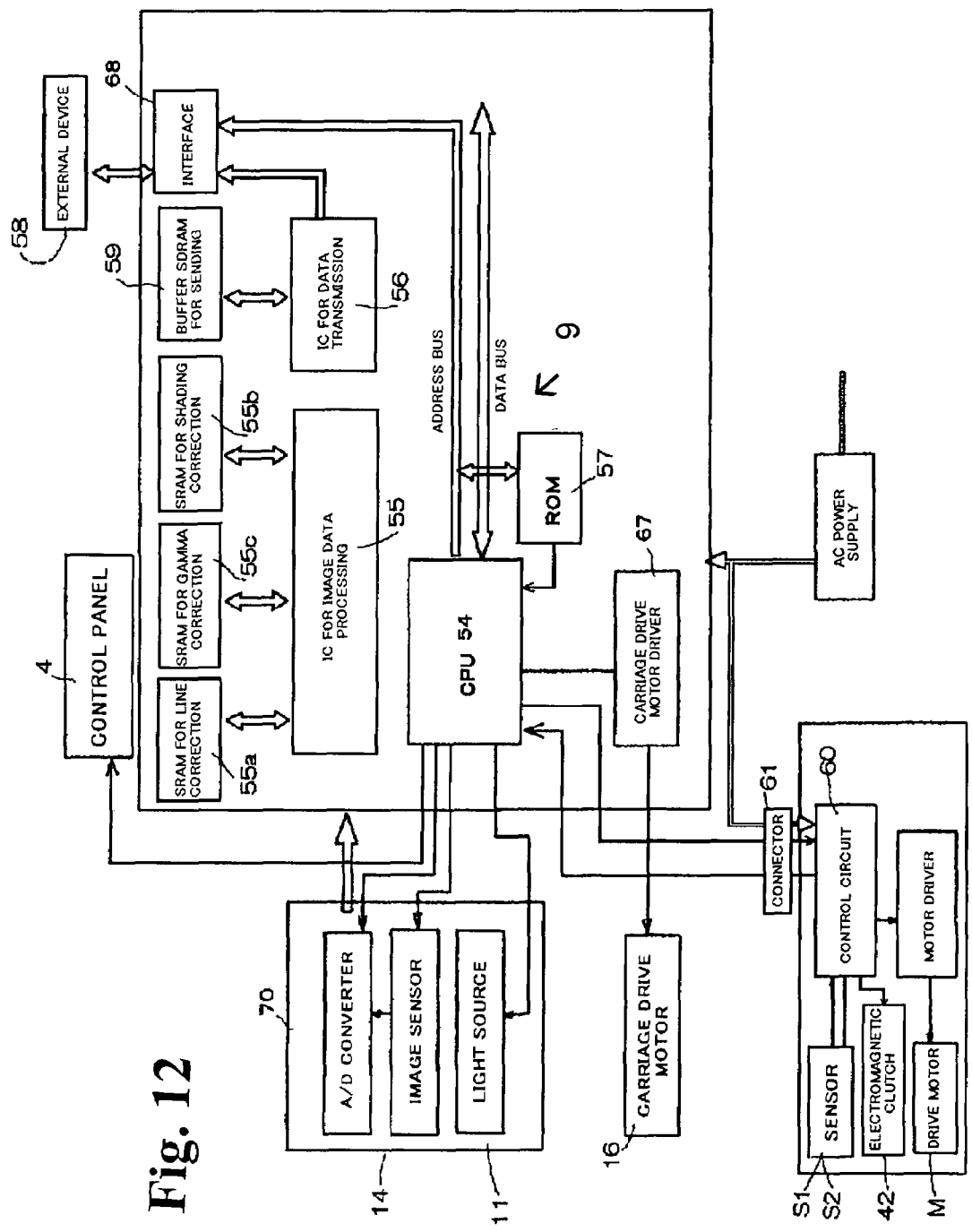
FIG. 12 is a diagram of the control circuit of the feeding device shown in FIG. 2.

With reference to FIG. 12, a control of the image reading apparatus and feeding device will be described. First, as a generally known arrangement, the image reading apparatus A reads the original put on the platen 2, the image data processing section 7 performs image processing, and the resultant data is transmitted from the data output section 8 to a computer, printer, etc. Then, the control section controls the optical reading mechanism 6 shown in FIG. 12. The image reading apparatus A has a built-in control board having a CPU 54, an image-processing IC 55, and an output data processing IC 56 incorporated therein.

Figure 7:
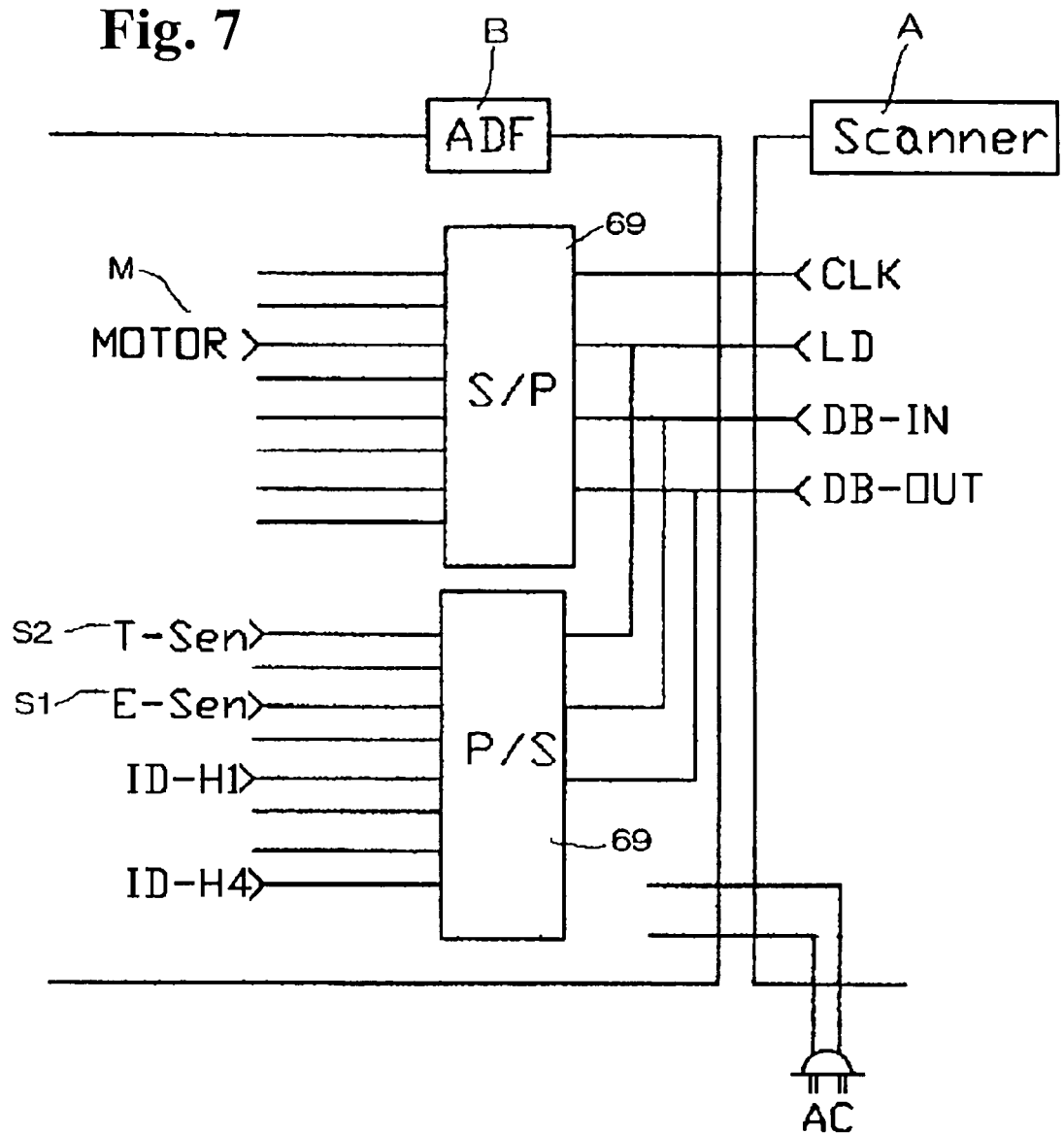
FIG. 7 is a diagram of a control circuit of the feeding device.

The central processing unit CPU 54 is composed of a processor for executing a control program of the ROM 57. The image-processing IC 55 is connected to an SRAM 55*a* for inter-line correction, an SRAM 55*b* for gamma correction, and an SRAM 55*c* for shading correction. The output data processing IC 56 is connected to a buffer SDRAM 59 and an interface 68 for sending data to an external device 58 such as a computer. The CPU 54 is connected to a driver 67 of the carriage drive motor 16, a light source 11, and a control circuit 70 of the photoelectric converter 14. The CPU 54 and the control circuit 60 of the feeding device communicate mutually to receive and transmit signals as shown in FIG. 7.

The control circuit 60 of the feeding device B is arranged so that signals in the control section 9 are transmitted to the drive motor M of the feeding device B and the driver circuit of the electromagnetic clutch 42 through the control section 9 and a serial-to-parallel converter means 69, and signals of sensors S1 and S2 (described later) are transmitted from the feeding device B to the control section 9.

The feeding device B is provided with an empty sensor S1 for detecting the original on the sheet feed stacker 17, and a jam sensor S2 for determining whether the original is accumulated at the discharge port of the discharge stacker 18 longer than a given time and no original reaches the discharge port for a period of time longer a given time. Signals detected by these sensors are sent to the feeder control circuit 60. The control section 9 of the image reading apparatus A and the feeder control circuit 60 are connected through a connector 61 with each other and communicate mutually to receive and transmit signals. The image reading apparatus A is arranged to supply power for the drive motor M to the feeding device.

In the image reading apparatus A, it is possible to select a reading mode through the control panel thereby to perform various operations including changing a regular operation mode, changing a scanning speed of the carriage 10 according to image types, e.g., color, monochrome, and gray scale, resolution, etc.

It is necessary to change the operation mode depending on whether the feeding device B is installed on the platen 2 or not. In the embodiment, a setting position is different by L1 and L2 as shown in FIG. 11, that is, the original fed by the feeding device varies is placed at a reading position different by L1 in a main scan direction and L2 in the sub-scan direction. Therefore, it is determined whether the connector 61 is connected, and when the connector is not connected, the reading operation is carried out in the regular operation mode, otherwise the following operations will be carried out.

When a reading start button in the control panel 4 is pushed, the control CPU 54 checks a status signal from the empty sensor S1 of the sheet feed stacker 17. When the original is not placed, the CPU 54 displays this situation on the panel to notify the user. When the original is placed, the CPU 54 sends a feed-order signal to the feeding device B to rotate the drive motor M of the feeding device in the forward direction. At the same time, the electromagnetic clutch 42 is connected to the shaft to rotate the paper feed roller 26. The rotation of the drive motor M is also transferred to the transporting rollers 37 and transport belts 19 to prepare for receiving the original.

The paper feed roller 26 is rotated to feed the original on the sheet feed stacker 17 toward the platen 2, and only the uppermost sheet passes over the friction pad 27 and is taken by the transporting roller 37. When the forward end of the sheet reaches the transporting roller 37, the electromagnetic clutch 42 is turned OFF according to a setting of a timer activated by the feed-order signal. The original is drawn out by the transporting roller 37, and reaches the transport belt 19 onto the platen 2.

At this time, the vacuum fan 29 is running by the feed-order signal, and the original on the platen 2 is sucked to the transport belts 19 to be transported. When the forward end of the original abuts against the original stopper 51, the original slides relative to the transport belts 19 and stops. After an estimated time that the forward end of the original reaches the original stopper according to the setting of the timer activated by the feed-order signal, the power to the drive motor M is shut off. At the same time, the control section 9 of the image reading apparatus A starts to read an image on the original sheet under set conditions.

After the reading position is corrected according to the predetermined L1 in the main scan direction and L2 in the sub-scan direction (see FIG. 11), the image data is subjected to the data processing, and the resultant data is transmitted from the data output section 8 to the external device such as a computer. When the carriage 10 completes the reading scan, the control section 9 sends a discharge-order signal to the feeding device B. The control circuit 60 of the feeding device B rotates the drive motor M in the reverse direction. The reverse rotation of the motor M drives the transport belt 19 in the reverse direction and the transporting roller 37 in the direction through the one-way clutch to transport the original leftward shown in FIG. 3, while the electromagnetic clutch 42 is turned OFF to idle the paper feed roller 26. As a result, the pick-up guide 41 guides the original to the paper guide 36. Then, the original is discharged to the discharge stacker 18 through the switching gate 40. The jam sensor S2 located at an upstream side of the discharge stacker 18 detects the rear end of the original sheet, and sends a discharge-completion signal to the control section 9 and waits for the next feed-order signal.

During the process, when the original is set on the sheet feed stacker 17, the operator lifts the discharge stacker 18 upward from the position shown in FIG. 9 to swing the rear end portion thereof around the pin 18*c* where the forward end portion of the stacker is attached. Accordingly, the distance between the rear end of the sheet feed stacker 17 and discharge stacker 18 is widened, so that a bundle of the original is inserted therein. At the same time, the forward end of the discharge stacker 18 abuts against the engagement surface 81*a* of the cam 81 when the stacker 18 is rotated by a given angle α (FIG. 10), and the stacker 18 is rotated further to rotate the cam 81 clockwise in FIG. 10.

When the cam 81 is rotated to swing the sheet feed, stacker 17 around the pin 25 against a force of the urging spring 17*c*. As a result, the forward end of the sheet feed stacker 17 is lowered to the position shown in FIG. 10, and moves away from the paper feed roller 26. Then, the forward end of the original falls in the space formed between the paper feed roller 26 and sheet feed stacker 17 without stress, so that the original is set in a given position.

Figure 10:
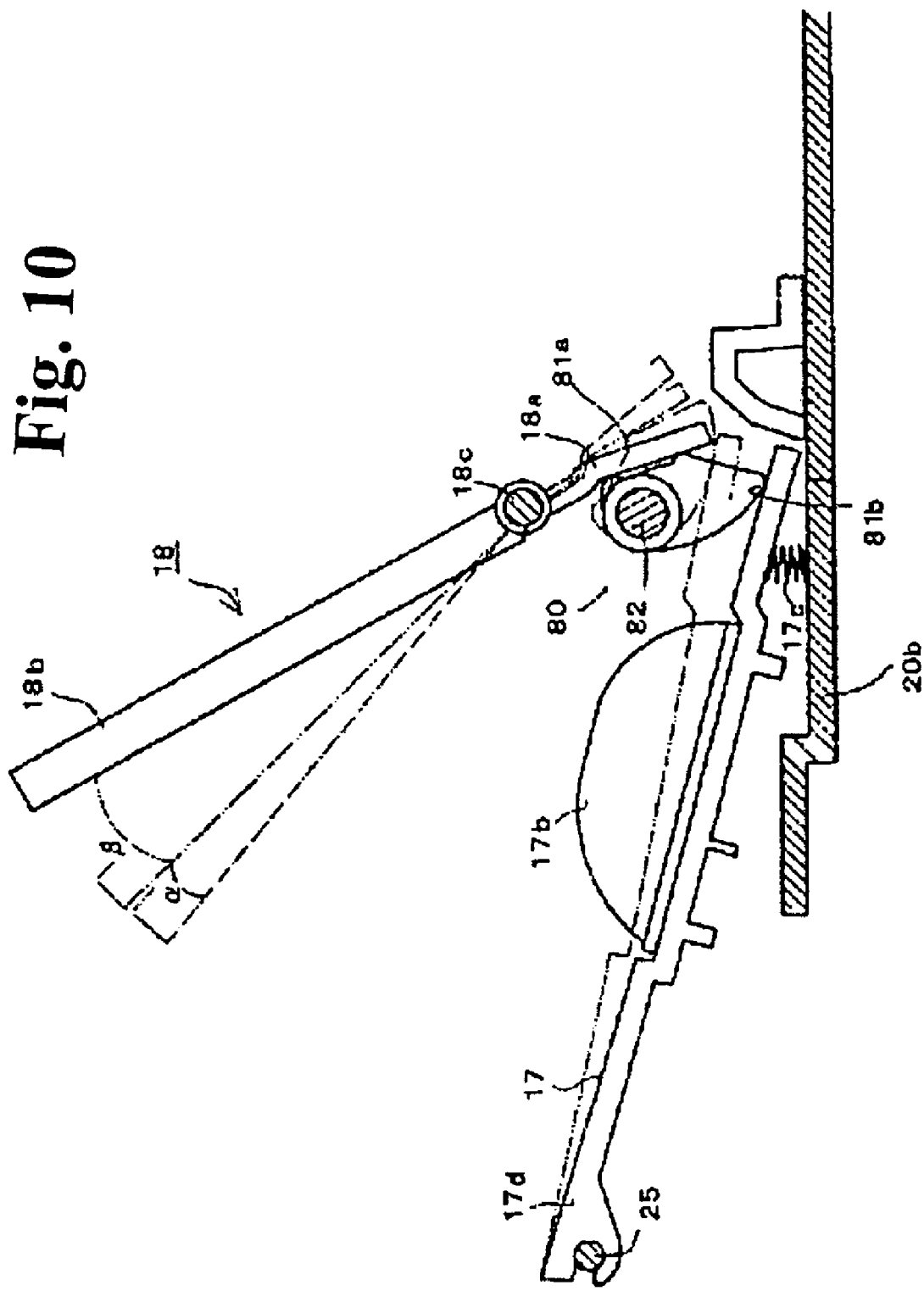
FIG. 10 is a view showing the sheet feed stacker and discharge stacker in an operation that the sheet is placed on the sheet feed stacker.

After the original is set on the sheet feed stacker 17, the operator returns the discharge stacker 18 from the position shown in FIG. 10 to the position shown in FIG. 9. The cam 81 is returned to the initial position by the force of the urging spring 17*c*.

As described above, according to the invention, the sheet feed stacker and transport belts are disposed substantially in a level along the surface of the platen, and a discharge stacker is disposed just above the sheet feed stacker. Accordingly, it is possible to arrange the entire device on the platen in a compact size, thereby facilitating the mounting and dismounting.

In addition, the original is fed from the sheet feed stacker to the transport belts through a substantially straight path, so that the original is surely transported along the transport belts even when the original is easy to stick to the platen like a photograph, etc. The vacuum fan is provided in the transport belts to facilitate the effect.

The discharge stacker and sheet feed stacker are provided vertically in parallel, so that there is an enough operation space for setting the original between the rear end of the sheet feed stacker and discharge stacker when the discharge stacker is rotated upwardly, thereby making the operation easy. The space is formed between the sheet feed stacker and the feeder means, e.g., the paper feed roller, above the forward end of the sheet feed stacker for receiving the forward end of the original, so that the original is correctly set without damaging. The discharge stacker is rotated to rotate the forward end of the sheet feed stacker, thereby making it easy to set the original.

In the invention, the sheet feed stacker and transporting means are disposed along the platen for reading an image, and the discharge stacker is provided above the sheet feed stacker vertically in parallel. As a result, the original is transported along the switchback route from the sheet feed stacker to the platen, and from the platen to the discharge stacker. Accordingly, the original is fed and transported smoothly along the substantially straight path with less stress. It is possible to provide the image reading apparatus, which is less prone to damage the original with a compact and light structure.

While the invention has been explained with reference to the specific embodiments of the invention, the explanation is illustrative and the invention is limited only by the appended claims.

What is claimed is:

1. A document feeder to be disposed above a platen of an image reading apparatus, comprising:
    a sheet feed stacker disposed above the platen for stacking an original,
    transporting means disposed above the platen adjacent to the sheet feed stacker for transporting the original from the sheet feed stacker to a predetermined position on the platen,
    a sheet discharge stacker disposed above the sheet feed stacker for storing the original transported from the transporting means,
    a transporting guide disposed between the sheet feed stacker and the transporting means, and between the sheet discharge stacker and the transporting means for guiding the original,
    drive means connected to the transporting means for driving the same and capable of rotating in forward and reverse directions,
    feeder means disposed adjacent to the sheet feed stacker for feeding the original from the sheet feed stacker to the transporting means, and
    interconnecting means disposed between the sheet feed stacker and the sheet discharge stacker, said sheet feed stacker and said sheet discharge stacker being pivotally arranged to enlarge a rear space between the sheet feed stacker and the sheet discharge stacker at a side adjacent to the transporting guide so that when the sheet discharge stacker is rotated, the interconnecting means is actuated to push a forward end of the sheet feed stacker in a direction away from the feeder means,
    wherein said feeder means includes a feed roller for drawing an uppermost original on the sheet feed stacker, said sheet feed stacker having urging means for pressing the forward end thereof against the feed roller, said transporting means having a transport belt for transporting the original, said sheet discharge stacker being supported on a frame rotatably around a forward end thereof in a sheet feeding direction, said sheet feed stacker being supported on the frame rotatably around a rear end thereof in the sheet feeding direction, said interconnecting means having a cam member provided between the sheet discharge stacker and the sheet feed stacker.

2. A document feeder according to claim 1, wherein said cam member includes a rotational cam with a rotational shaft so that when the sheet discharge stacker is rotated by a predetermined angle, the rotational cam is pushed by the sheet discharging stacker to thereby move the sheet feed stacker away from the feed roller.

3. An image reading apparatus comprising:
    the platen for placing an original thereon,
    photoelectric converting means disposed adjacent to the platen for reading the original on the platen, and
    the document feeder according to claim 1, disposed on the platen.

* * * * *